(12) United States Patent
Lee

(10) Patent No.: US 10,904,990 B2
(45) Date of Patent: Jan. 26, 2021

(54) INTERNET OF THINGS SYSTEM

(71) Applicant: TAIWAN OASIS TECHNOLOGY CO., LTD., New Taipei (TW)

(72) Inventor: Wei-Long Lee, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/354,334

(22) Filed: Mar. 15, 2019

(65) Prior Publication Data

US 2020/0296810 A1    Sep. 17, 2020

(51) Int. Cl.
  *H05B 47/19* (2020.01)
  *H04L 12/28* (2006.01)
  *H05B 47/105* (2020.01)

(52) U.S. Cl.
  CPC .......... *H05B 47/19* (2020.01); *H04L 12/281* (2013.01); *H05B 47/105* (2020.01)

(58) Field of Classification Search
  CPC .... G08C 17/02; G08C 19/28; G08C 2201/20; G08C 2201/92; G08C 23/04; G08C 2201/21; G08C 17/00; G08C 2201/30; G08C 2201/40; G08C 2201/93; G08C 19/00

USPC ..................................................... 340/12.23
See application file for complete search history.

(56) References Cited

U.S. PATENT DOCUMENTS

| | | | | |
|---|---|---|---|---|
| 9,313,863 | B2 * | 4/2016 | Hershberg | H04L 67/36 |
| 9,655,217 | B2 * | 5/2017 | Recker | H02J 9/02 |
| 9,860,965 | B2 * | 1/2018 | Recker | H02J 9/02 |
| 9,949,231 | B2 * | 4/2018 | Kim | H04W 24/08 |
| 10,097,529 | B2 * | 10/2018 | Kang | H04L 63/08 |
| 10,321,182 | B2 * | 6/2019 | Herz | H04W 4/38 |
| 10,388,159 | B2 * | 8/2019 | Yi | G08G 1/0967 |

* cited by examiner

*Primary Examiner* — Omar Casillashernandez
(74) *Attorney, Agent, or Firm* — Demian K. Jackson; Jackson IPG PLLC

(57) ABSTRACT

An Internet of Things (IoT) system is illustrated, which has a power switch and an IoT device. The power switch electrically connected to the IoT device provides power to the IoT device. The IoT device has a memory unit, a control unit and a networking unit. When the power switch switches the control unit to a power supplying state from a non-power supplying state, the power switch generates a switch surge signal, and transmits the switch surge signal to the control unit, and the control unit receives the switch surge signal and executes a reset control command stored in the control unit, so as to reset the IoT device. The IoT system of the present disclosure utilizes the switch surge signal to reset the IoT device be reset without installing a reset button.

11 Claims, 2 Drawing Sheets

INTERNET OF THINGS SYSTEM

BACKGROUND

Technical Field

The present disclosure relates to an Internet of Things (IoT) system, in particularly, to the IoT system having an IoT device which receives a switch surge signal from the power switch and then executes a setting process.

Related Art

Internet of Things is a network based on information carriers of Internet and a communication network, and makes devices be independently addressed and communicate with each other. By IoT, the machines, apparatuses and people can be centrally managed and controlled, home appliances and cars can be monitored, and IoT can be applied in applications, such as location finding and thievery prevention of items.

Recently, with development and popular utilization of IoT, generally used devices which independently performs their original functions can further have networking functions, and thus applications of kinds can be implemented, such as lighting devices and home appliances can link to Internet to form IoT to bring life and generation convenience to people. However, related products still require cumbersome installation steps and information inputs, and such installations are not friendly to general users.

For example, an IoT device is implemented as a water pump being disposed near a water storage pool outside a house, and a power switch of the water pump is usually disposed in the house. When a controller or a networking unit of the water pump gets a crash, the user must go outside the house to push the reset button of the water pump to reset the controller or the networking unit. For another example, an IoT device is implemented as a lighting device mounted to a ceiling. When a controller or a networking unit of the lighting device gets a crash, the user must climb to the ceiling to push the reset button of the lighting device to reset the controller or the networking unit. The above two situations actually cause unfriendliness and safety issues to the users when resetting the IoT devices.

SUMMARY OF THE INVENTION

Accordingly, the present disclosure provides an IoT system which utilizes a switch surge signal to reset an IoT device of the IoT system, such that it brings friendliness and convenience to a user for using the IoT device.

To achieve one of the above objectives, the IoT system at least comprises a power switch and an IoT device. The power switch is electrically connected to the IoT device, the power switch provides power to the IoT device, and the IoT device comprises: a memory unit having a non-volatile memory unit, wherein the non-volatile memory unit stores a setting process and setting information; a control unit being electrically connected to the non-volatile memory unit, wherein the control unit acquires the setting process and the setting information in the non-volatile memory unit to execute a first control command, and stores a first result in the memory unit, wherein the first result is generated after the first control command is executed; and a networking unit comprising a networking processor, a transmitting unit and a receiving unit, wherein the networking processor is electrically connected the control unit, the transmitting unit and the receiving unit; wherein when the power switch switches the control unit to a power supplying state from a non-power supplying state, the power switch generates a switch surge signal, the power switch transmits the switch surge signal to the control unit, the control unit receives the switch surge signal, and then executes a reset control command stored in the control unit, and the reset control command drives the control unit to acquire the setting process and the setting information in the non-volatile memory unit to execute a first control command, and stores a first result in the memory unit after the first control command is executed.

The IoT system executes a method of resetting the IoT system to reset the IoT system to a factory mode or a user mode. The method of resetting the IoT system comprises the following steps: a step of supplying the power, a step of activating the factory mode, a step of transmitting, a step of editing, a step of recording the user mode, a step of generating the switch surge signal and a step of resetting.

DESCRIPTIONS OF DRAWINGS IN THE INVENTION

DESCRIPTIONS OF EMBODIMENTS IN THE INVENTION

Embodiments of the present disclosure will now be described, by way of example only, with reference to the accompanying drawings. The following drawings are dedicated for description, and they are schematic and exemplary, being not drawn and precisely allocated in accordance with the actual ratio, thus not limiting the present disclosure.

An IoT device in the present disclosure is a thing of any kind (such as, an equipment or a sensor) having an addressable communication interface (such as, a communication interface of Internet addressing, Bluetooth® identification, near field communication (NFC)) which can transmits information to one or more other devices via a wireless or wired link. The IoT device of the present disclosure can have a passive communication device interface, such as a quick response (QR) code, a radio frequency identification (RFID) tag, a NFC tag or other similar one. Or alternatively, the IoT device of the present disclosure can have an active communication device interface, such as a modem, a transceiver or other similar one. The IoT device of the present disclosure can be a power device, a lighting device, a security device, an air condition device, a home appliance, an audio-visual entertainment device or other monitor device with one or more sensors for sensing a motion, a sound, an image, a temperature, a humidity, an air pressure, a gas and/or a ultraviolet light. For example, the IoT device of the present disclosure can comprises one of a refrigerator, a bread machine, an oven, a microwave, a freezer, a dishwasher, a plate, a hand tool, a washing machine, a dryer, a stove, an air conditioner, a thermostat, a TV, a lamp, a vacuum cleaner, a sprinkler, an electricity meter, a gas meter and so on. That is, the IoT device of the present disclosure is the thing having the addressable communication interface for IoT communication, and the kind of IoT device of the present disclosure is not intended to limit the present disclosure.

Figure 1:
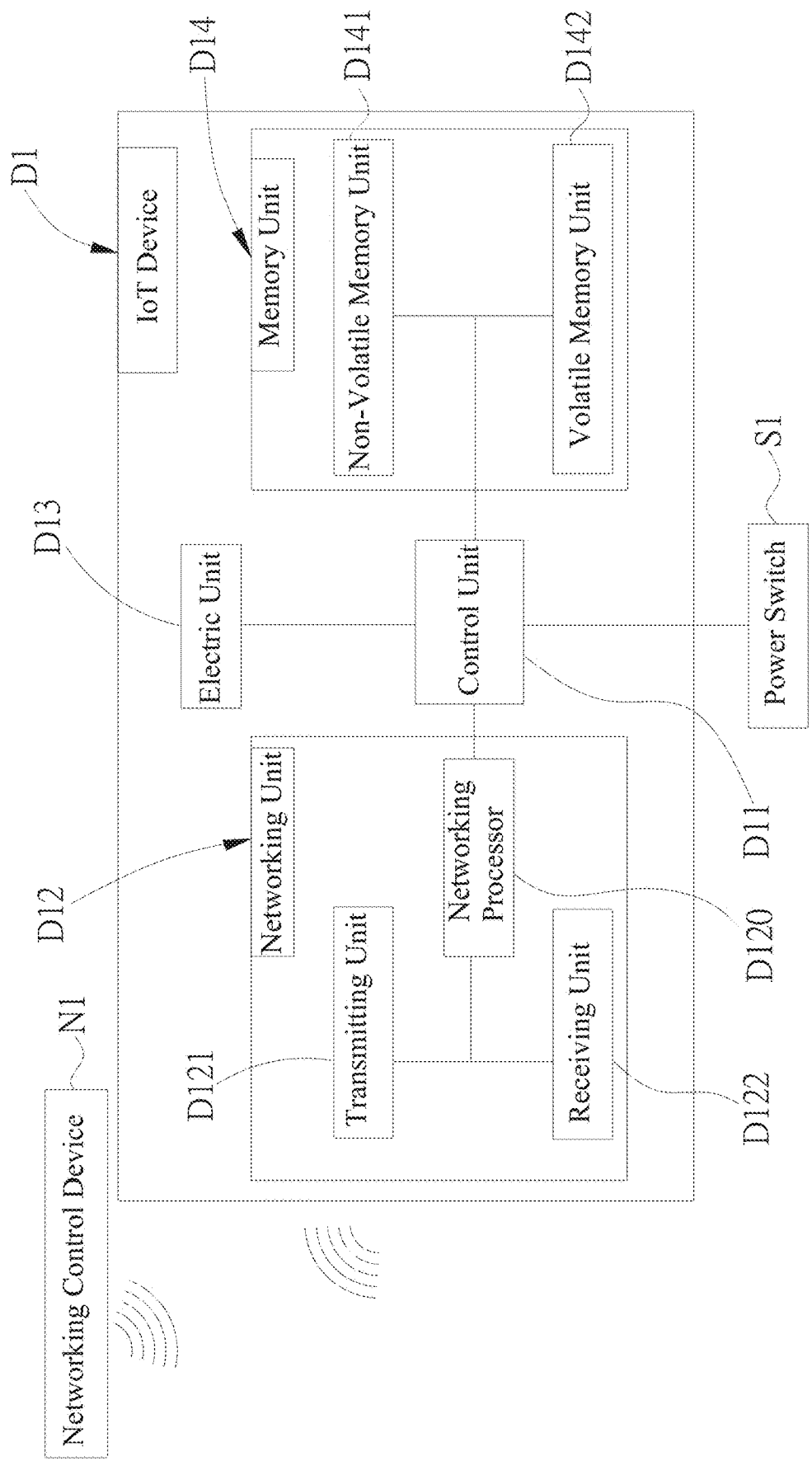
FIG. 1 is a configuration block diagram of an IoT system of the present disclosure.

Next, refer to FIG. 1. An IoT system comprises a power switch (S1) and an IoT device (D1). The power switch (S1) is electrically connected to the IoT device (D1), and thus the power switch (S1) provides power to the IoT device (D1). The IoT device (D1) comprises a control unit (D11), a networking unit (D12), an electric unit (D13) and a memory unit (D14). The memory unit (D14) is electrically connected to the control unit (D11), the memory unit (D14) has a non-volatile memory unit (D141) and a volatile memory unit (D142), the control unit (D11) is electrically connected to the non-volatile memory unit (D141) and the volatile memory unit (D142), and the memory unit (D14) stores a setting process and setting information in the non-volatile memory unit (D141). The control unit (D11) is electrically connected to the power switch (S1), and the power from the power switch (S1) can drive the control unit (D11) to execute a first command stored in the control unit (D11), and to store a first result in the volatile memory unit (D142) after the first control command is executed. For example, the control unit (D11) acquires the setting process and the setting information in the non-volatile memory unit (D141) to execute the first command, and stores the first result in the volatile memory unit (D142) after the first control command is executed.

The control unit (D11) is electrically connected to the electric unit (D13), and thus the control unit (D11) can execute the first control command to provide the full power, the partial power or none of the power to the electric unit (D13), so as to control operation of the electric unit (D13). For example, the electric unit (D13) is a lamp, the control unit (D11) provides the full power, the partial power or none of the power to the lamp, and thus the lamp is fully bright, half bright or off.

The control unit (D11) is electrically connected to the networking unit (D12), and the networking unit (D12) comprises a networking processor (D120), a transmitting unit (D121) and a receiving unit (D122). The networking processor (D120) is electrically connected to the control unit (D11), the transmitting unit (D121) and the receiving unit (D122). The networking processor (D120) executes the first control command from the control unit (D11), and generates transmitting information (or upload information) of the first control command to the transmitting unit (D121). By using the transmitting unit (D121), the transmitting information is transmitted to exterior via a transmitting manner, for example, the transmitting unit (D121) transmits the transmitting information to a networking control device (N1) via the transmitting manner, and the transmitting information comprises information of the first result. Via a receiving manner, the receiving unit (D122) receives receiving information (or download information) from the networking control device (N1) disposed at the exterior, and transmits the receiving information to the networking processor (D120). Next, the networking processor (D120) converts the receiving information into a second control command, and the second control command is transmitted to the control unit (D11). Then, the control unit (D11) executes the second control command, and stores a second result in the volatile memory unit (D142) or the non-volatile memory unit (D141) after the second control command is executed. The second result comprises a user setting process and user setting information. Furthermore, the control unit (D11) can execute the second control command to provide the full power, the partial power or none of the power to the electric unit (D13), so as to control the operation of the electric unit (D13). For example, the electric unit (D13) is a lamp, the control unit (D11) provides the full power, the partial power or none of the power to the lamp, and thus the lamp is fully bright, half bright or off.

The receiving manner and the transmitting manner are independent to each other, and each of them can be a Wi-Fi communication protocol, a 3G communication protocol, a 4G communication protocol, a 5G communication protocol, Bluetooth® or NFC. The networking control device (N1) can be a smart phone, a pad computer, a notebook, a smart wearable device, a cloud server, a database server, an application program server, a workstation, a personal computer or other computing device having a computing ability.

When the power switch (S1) switches the control unit (D11) from a power supplying state to a non-power supplying state, the power switch (S1) generates a switch surge signal; or alternatively, when the power switch (S1) switches the control unit (D11) to the power supplying state from the non-power supplying state, the power switch (S1) generates the switch surge signal. The power switch (S1) transmits the switch surge signal to the control unit (D11), and the control unit (D11) receives the switch surge signal, and then executes a reset control command stored in the control unit (D11) to reset the IoT device. The reset control command is used to drive the control unit (D11) to acquire the setting process and the setting information stored in the non-volatile memory unit (D141) to execute the first control command, and to store the first result in the volatile memory unit (D142) after the first control command is executed, thus achieving effect of resetting the IoT device.

It is noted that the setting process and the setting information can respectively be the factory setting process and the factory setting information, the factory setting process and the setting information are stored in the non-volatile memory unit (D141), and the factory setting process and the setting information are stored in in the non-volatile memory unit (D141) when the IoT device (D1) is manufactured. Or alternatively, the setting process and the setting information can respectively be the user setting process and the user setting information stored in the non-volatile memory unit (D141).

Figure 2:
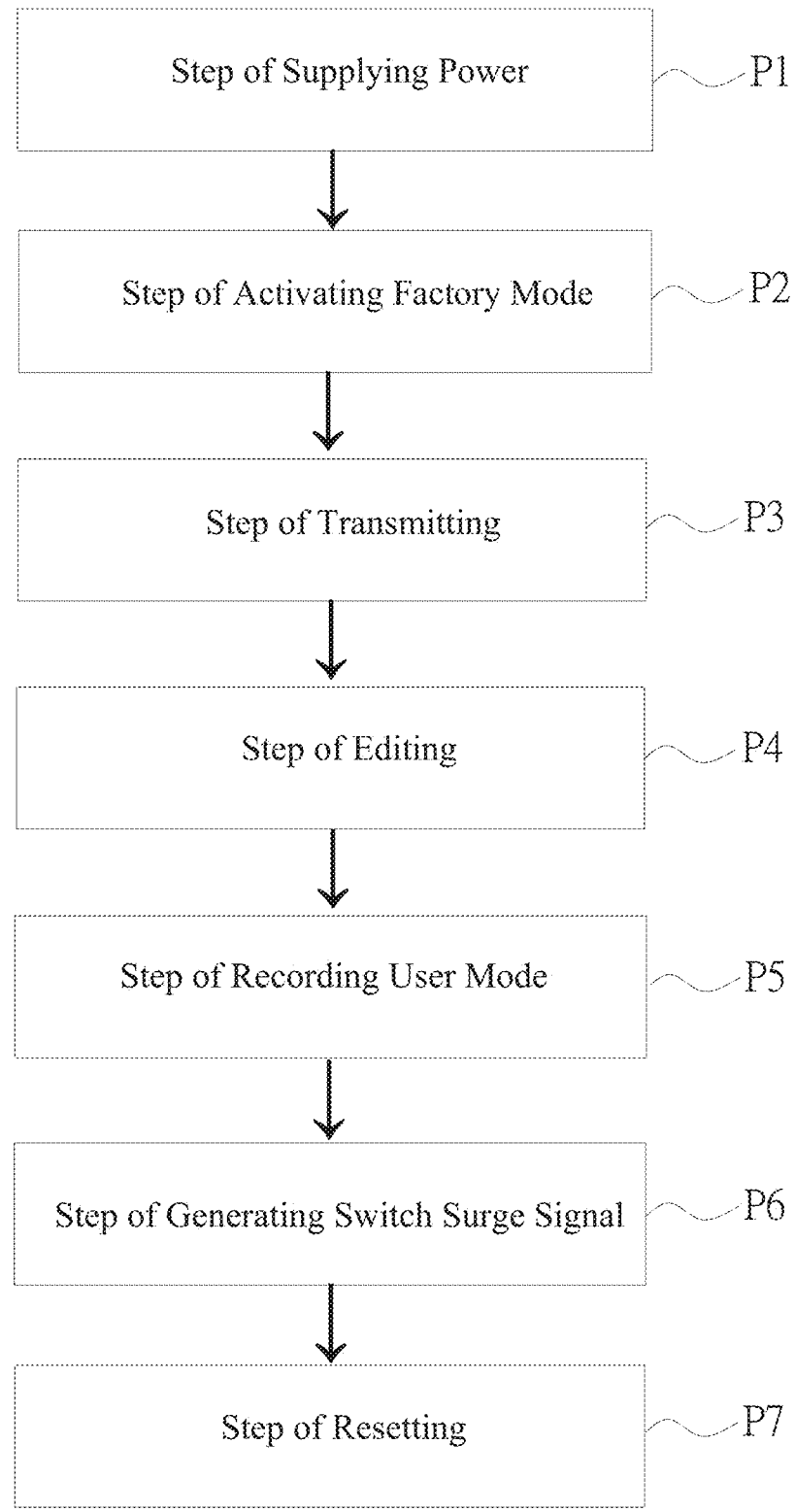
FIG. 2 is a flow chart showing a method of resetting an IoT system of the present disclosure.

To put it concretely, after the IoT system is established, a method of resetting the IoT system is executed to reset the IoT system to operate in a factory mode or a user mode. Referring to FIG. 2, the method of resetting the IoT system comprises the following steps.

A step of supplying the power (P1): the power switch (S1) provides the power to the control unit (D11).

A step of activating the factory mode (P2): the control unit (D11) acquires the factory setting process and the factory setting information stored in the non-volatile memory unit (D141) to execute the first control command, and stores the first result in the volatile memory unit (D142) after the first control command is executed, wherein the first result corresponds to the factory mode.

A step of transmitting (P3): the transmitting unit (D121) transmits the first result to the networking control device (N1).

A step of editing (P4): the user operates the networking control device (N1) via an application (APP) to edit the first result to be the receiving information, the networking control device (N1) transmits the receiving information to the receiving unit (D122), the receiving unit (D122) transmits the receiving information to the networking processor (D120), and then, the networking processor (D120) converts the receiving information to the second control command, and transmits the second control command to the control unit (D11).

A step of recording the user mode (P5): the control unit (D11) executes the second control command, and stores the second result in the volatile memory unit (D142) or the non-volatile memory unit (D141) after the second control command is executed, wherein the second result comprises the user setting process and the user setting information, and the second result corresponds to the user mode.

When the IoT system must be reset to the factory mode or the user mode (for example, the user finds that the IoT device (D1) gets the crash), the user can make the IoT system execute the following steps.

A step of generating the switch surge signal (P6): the power switch (S1) is controlled to switch the control unit (D11) from the power supplying state to the non-power supplying state, for example, turning off the power switch (S1); next, the power switch (S1) is controlled to switch the control unit (D11) from the non-power supplying state to the power supplying state, and to generate the switch surge signal to the control unit (D11).

A step of resetting (P7): the control unit (D11) receives the switch surge signal, and then executes the reset control command stored in the control unit (D11), the reset control command drives the control unit (D11) to acquire the setting process and the setting information stored in the non-volatile memory unit (D141) to execute the first control command, and then the first result is stored in the volatile memory unit (D142) after the first control command is executed.

Therefore, after the step (P7) is finished, the reset of the IoT system can be completed, and the IoT system is reset to the factory mode or the user mode. The IoT device (D1) of the IoT system does not require the installation of a reset button, and the effect of resetting the IoT device (D1) can still be achieved. Further, even the IoT device (D1) is installed with the reset button, it is not essential that the user must go to the IoT device (D1) to push the reset button to reset IoT device (D1), as mentioned in the prior art.

Although particular embodiments of the present disclosure have been described in detail for purposes of illustration, various modifications and enhancements may be made without departing from the spirit and scope of the present disclosure. Accordingly, the present disclosure is not to be limited except as by the appended claims.

The invention claimed is:

1. An Internet of Things (IoT) system, at least comprising: a power switch and an IoT device, the power switch is electrically connected to the IoT device, the power switch provides power to the IoT device, and the IoT device comprises:
   a memory unit having a non-volatile memory unit, wherein the non-volatile memory unit stores a setting process and setting information;
   a control unit being electrically connected to the non-volatile memory unit, wherein the control unit acquires the setting process and the setting information in the non-volatile memory unit to execute a first control command, and stores a first result in the memory unit, wherein the first result is generated after the first control command is executed; and
   a networking unit comprising a networking processor, a transmitting unit and a receiving unit, wherein the networking processor is electrically connected the control unit, the transmitting unit and the receiving unit;
   wherein the setting process and the setting information in the non-volatile memory unit are respectively a factory setting process and factory setting information stored in the non-volatile memory unit, when the IoT system must be reset to a factory mode, a user makes the power switch switch the control unit to a non-power supplying state from a power supplying state, and next, when the power switch switches the control unit to a power supplying state from a non-power supplying state, the power switch generates a switch surge signal, the power switch transmits the switch surge signal to the control unit, the control unit receives the switch surge signal, and then executes a reset control command stored in the control unit, and the reset control command drives the control unit to acquire the factory setting process and the factory setting information in the non-volatile memory unit to execute a first control command, and stores a first result in the memory unit after first control command is executed, therefore, the IoT system is reset to be the factory mode, and the first result corresponds to the factory mode.

2. The IoT system according to claim 1, wherein the memory unit further has a volatile memory unit being electrically connected to the control unit, and the first result is stored in the volatile memory unit.

3. The IoT system according to claim 1, wherein the networking processor executes the first control command from the control unit to generate transmitting information to the transmitting unit, and the transmitting unit transmits the transmitting information to exterior via a transmitting manner, the transmitting information comprises the first result; the receiving unit receives receiving information from the exterior via a receiving manner, the receiving unit transmits the receiving information to the networking processor; the networking processor converts the receiving information to a second control command, and transmits the second control command to the control unit, the control unit stores a second result in the memory unit, wherein the second result is generated after the second control command is executed.

4. The IoT system according to claim 3, wherein the second result is store in a volatile memory unit or the non-volatile memory unit of the memory unit, and the control unit is electrically connected to the volatile memory unit, the second result comprises a user setting process and user setting information.

5. The IoT system according to claim 4, wherein the setting process and the setting information are respectively the user setting process and the user setting information stored in the non-volatile memory unit.

6. The IoT system according to claim 5, wherein the IoT device comprises an electric unit being electrically connected to the control unit.

7. The IoT system according to claim 6, wherein the control unit executes the first control command to provide the full power, the partial power or none of the power.

8. The IoT system according to claim 6, wherein the electric unit is a lamp.

9. The IoT system according to claim 1, wherein when the IoT device is in a crash state, the IoT system must be reset to the factory mode.

10. The IoT system according to claim 1, wherein the factory setting process and the setting information are stored in the non-volatile memory unit when the IoT device is manufactured.

11. The IoT system according to claim 1, wherein the IoT device of the IoT system is not installed with a reset button.

* * * * *